Nov. 25, 1958  H. G. POSTHUMUS  2,862,182
NINETY-DEGREE PHASE METER DISCRIMINATORS
Filed June 10, 1954  2 Sheets-Sheet 1

INVENTOR.
HARRY G. POSTHUMUS
BY
ATTYS.

Nov. 25, 1958     H. G. POSTHUMUS     2,862,182
NINETY-DEGREE PHASE METER DISCRIMINATORS
Filed June 10, 1954     2 Sheets-Sheet 2

INVENTOR.
HARRY G. POSTHUMUS
BY
ATTYS.

United States Patent Office 2,862,182
Patented Nov. 25, 1958

2,862,182
NINETY-DEGREE PHASE METER DISCRIMINATORS

Harry G. Posthumus, Zanesville, Ind., assignor to the United States of America as represented by the Secretary of the Navy Application June 10, 1954, Serial No. 435,950

7 Claims. (Cl. 324—87)

(Granted under Title 35, U. S. Code (1952), sec. 266)

The invention described herein may be manufactured and used by or for the Government of the United States of America for goverenmental purposes without the payment of any royalties thereon or therefor.

This invention relates to phase meters and more particularly to phase discriminator circuits of phase meters, which circuits are readily adjustable and correctible for shifts in circuit constants and for inequalities of circuit elements, to detect the phase relation of two alternating current voltages.

In prior known phase meters the circuit components had to be of high precision and in some cases it was necessary to have perfectly matched elements. It is exceedingly difficult to obtain electrical components as transformers, diodes, resistors, vacuum tubes, and capacitors of sufficiently high quality to build a perfectly accurate phase meter. The best equipment must be calibrated before use which is usually done relying on other equipment to fix a phase standard.

In the present invention the usual and ordinary electrical elements and components may be used in the construction of the phase meter. The phase discriminator component of the phase meter has novel circuit means connected therewith to check the reliability of the meter for each of two input conditions of two voltages under consideration, to compensate for inequalities of unmatched elements, and to compensate for electrical drift of circuit elements. The discriminator component shown and described to illustrate this invention consists, in general, of two torodial transformers, four diodes, and two resistances. A diode is in each lead of one transformer secondary, paired leads each providing one lead of a rectified output circuit. The two resistors are coupled across the rectified leads, a tap therebetween connecting the center tap of the other transformer secondary. The secondary legs of the other transformer are each center tapped to the first transformer secondary. An alternating current voltage is impressed on the primary of each transformer for phase determination. The present invention contemplates the utilization of a cross-switch in the circuit of the two voltage inputs to the transformer primarys so that the two voltages may be considered on either of the two transformers. An additional switching means also provides for reversing the primary polarity of one of the transformers. A compensating circuit is coupled to the transformer-diode circuit for making phase compensation for difference in phase shifts in the transformers as determined by cross-switching the applied voltages and by reversing the polarity of one transformer. A diode compensation circuit is coupled in the transformer-diode circuit providing a means to correct for diode drift. All of these compensating circuits and switches being incorporated in the phase discriminator makes it possible to rapidly calibrate the phase meter without reference to any outside standard whereby immediate indications of the phase relations of two A. C. voltages may be obtained. It is therefore a general object of this invention to provide a novel phase discriminator circuit having compensating and checking networks therein to condition said discriminator for highly accurate phase indications in a phase meter having two alternating current voltage inputs.

Other objects, advantages, features, and uses will become more apparent as the description proceeds when considered in view of the accompanying drawings, in which.

Figure 1:
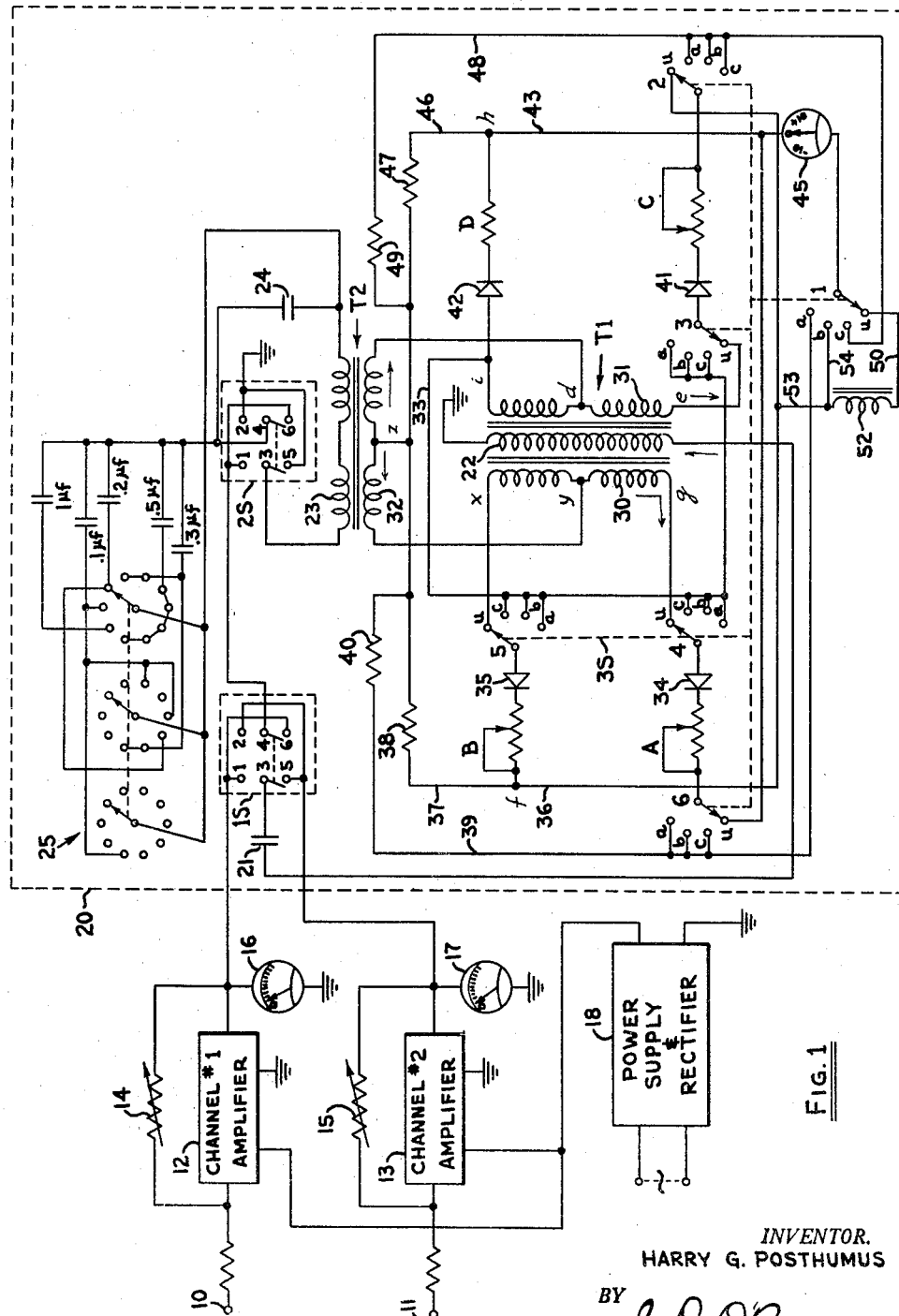
Figure 1 is a circuit diagram, partly in block and partly schematic, of a phase meter incorporating the invention.

Referring more particularly to Figure 1 where the circuit for a phase meter is illustrated, two terminals 10 and 11 are adapted to have two voltages applied thereto which are to be considered for phase relation. The terminal 10 is connected to an amplifier 12 and the terminal 11 is connected to an amplifier 13. The two amplifiers are designed for high gain and for a negligible amount of phase shift near 400 cycles. The phase shift of these amplifiers, if any, should be identical. The phase shift of these amplifiers is made negligible by using negative feedback and these amplifiers are designed to give an output of about 8 volts although the output may be changed to meet certain demands. The input voltages, for the purpose of example, may have any magnitude from 1 to 15 volts. Each amplifier, 12 and 13, has a level meter 16 and 17, respectively, connected therewith and a variable resistance 14 and 15, respectively, in the feedback circuit so that the voltage level of the output of each can be adjusted. The two voltages under consideration are assumed to be in close phase relation of near 90 degrees to be effective for determination by this phase meter, as is well understood. For the purpose of convenience the path of the voltage applied to terminal 10 will be referred to as channel 1 and the path of the voltage applied to the terminal 11 will be referred to as channel 2. The rectified power supply for the amplifiers is supplied by the unit 18 in the well known manner.

The amplifier outputs are coupled to a phase discriminator 20 schematically shown. The two amplifier output channels are connected to a double-pole, double throw switch, generally referred to by the reference character 1S. Channel 1 is connected to the terminals 1S–1 and 1S–6 and channel 2 is connected to terminals 1S–2 and 1S–5. Switch blade 1S–3 is coupled through a capacitor 21 to the primary winding 22 of a transformer T1, one lead of the primary being grounded. Switch blade 1S–4 is connected to the terminals 2S–1 and 2S–6 of a second double pole, double throw switch, generally referred to by the reference character 2S. Terminals 2S–2 and 2S–5 are grounded. The switch blade 2S–3 is connected through the primary winding 23 of a second transformer, generally referred to by the reference character T2, and through a fixed condenser 24 to the switch blade 2S–4. In parallel with the fixed condenser 24 is a compensating capacitor circuit 25, the purpose of which will hereinafter be set out. It is to be understood, however, that the capacity can be varied in the compensating circuit 25 by the gang switch switching in different combinations of fixed capacitors, as shown. It is also to be understood that the compensating circuit may be a variable inductive circuit, where desirable.

The transformer T1 has two center-tapped secondary windings 30 and 31. The transformer T2 has a center-tapped secondary winding 32 connected at $z$ to the center taps of $y$ and $d$ of the secondaries 30 and 31, respectively. The lead $i$ of the secondary 31, as shown, is connected by a conductor 33 to terminals $a$, $b$, and $c$ of gangs 3, 4, and 5 of a six gang switch generally recognized by the reference character 3S. The other leads of the secondaries 30 and 31, as $x$, $g$, and $e$ are each directly connected to the terminals 3S5$u$, 3S4$u$, and 3S3$u$ respectively. The switch blade of 3S4 is connected through a diode 34 and a variable resistance A to the switch blade of 3S6. The switch blade 3S5 is connected through a diode 35 and a variable resistance B to a conductor 36 which terminates at the terminal 3S2$u$. The variable resistance B is also connected by a conductor 37 through resistance 38 to the center-tap $z$ of the transformer T2 secondary 32. The center-tap $z$ of secondary 32 is also connected by conductor 39 through resistance 40 to terminals $a$, $b$, and $c$ of 3S6 and to terminal $a$ of 3S1. The switch blade of 3S3 is connected through a diode 41 and a variable resistor C to the switch blade of 3S2. The lead $i$ from the top of the secondary winding 31, as shown, is connected through a diode 42 and fixed resistor D to a conductor 43 connected to one terminal of a phase indicator 45. The resistor D is also connected by conductor 46 through resistor 47 to the center-tap $z$ of the secondary 32. This center-tap $z$ of secondary 32 is also connected by conductor 48 through resistor 49 to terminals $a$, $b$ and $c$ of 3S2 and terminal $c$ of 3S1. The switch blade of 3S1 is connected to the other terminal of the phase indicator 45. Terminal $u$ of 3S1 is connected through a choke 52 and by a conductor 53 to the conductor 36 between the variable resistor B and the terminal 3S2$u$ although this connection could be made at either terminal point. The terminal $b$ of 3S1 is connected in like manner and shown as coupled by the conductor 54.

Figure 2:
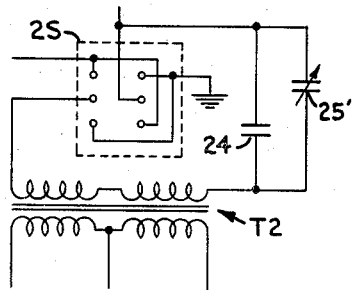
Figure 2 is a partial schematic circuit of Figure 1.

The purpose of the compensating capacitor network 25 is to compensate for phase differences inherently built into the transformers T1 and T2 as will more clearly be brought out below in the description. As shown in Figure 2 this compensating network may be kept simple by using a variable condenser 25′ in parallel to the fixed capacitor 24 to produce the compensating capacitive reactance necessary to phase shift the transformer T2 to correspond to that of T1. As hereinbefore stated, this circuit could be an inductive one wherein the phase compensation may be effected by varying inductive reactance as well as capacitive reactance, or both.

Figure 3:
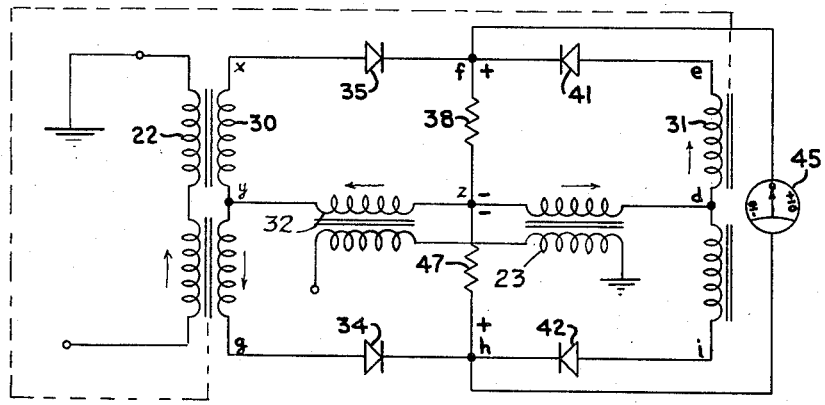
Figure 3 is a simplified circuit view of a phase discriminator.

Referring now more particularly to Figure 3, there is illustrated a simplified phase discriminator circuit of the phase discriminator circuit 20 shown in Figure 1 with which it is believed a better understanding may be had of the function thereof. The switching and compensating circuits and the variable controls have been eliminated from the simplified circuit. Like reference characters apply to like parts. On the transformer T1 the two center-tapped secondaries 30 and 31 provide four effective secondaries each of which have $nE_a$ volts across them, the quantity $n$ being the ratio of the secondary to the primary windings. In this figure the secondaries 31 have been reversed for simplicity of the circuit current relation of the various primaries and secondaries at one instant each being denoted by an arrow. It has been found expedient to make the secondaries 30 and 31 quad-filar windings to maintain good match and to balance the resistance and reactance thereof. The two secondaries 32 of the transformer T2 are bi-filar. In this manner a mismatch of turns is virtually impossible and good balance of resistance and reactance is maintained. The transformer secondaries 32 of transformer T2 will each have a voltage of $nE_b$ across them. This voltage will appear across the terminal points $y$—$z$ and $z$—$d$ while the voltage $nE_a$ will appear across $x$—$y$, $y$—$g$, $d$—$e$, and $d$—$i$. The voltage across $x$—$z$ and $z$—$e$ is $n(E_a+E_b)$. The upper half of the circuit $x$—$y$—$z$—$d$—$e$—$f$ is a full wave rectifier producing a positive direct current (D. C.) potential across $f$—$z$ the average value of which is $.9n|\bar{E}_a+\bar{E}_b|$ where $|\bar{E}_a+\bar{E}_b|$ is the magnitude of the vector sum of $E_a$ and $E_b$. In like manner, the voltage across $g$—$z$ and $z$—$i$ is $n(E_a-E_b)$ and the average positive D. C. potential across $h$—$z$ for the lower half of the circuit is $.9n|\bar{E}_a-\bar{E}_b|$. When the absolute quantity $|\bar{E}_a+\bar{E}_b|$ is equal to the absolute quantity $|\bar{E}_a-\bar{E}_b|$ the angle between voltage vectors on secondary sides $nE_a$ and $nE_b$ is 90 degrees.

Figure 4:
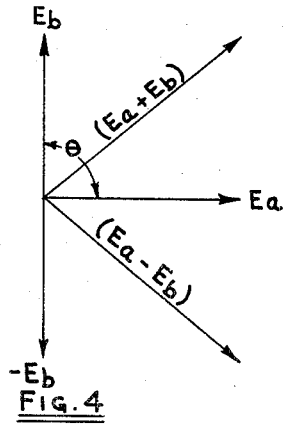
Figures 4 and 5 are vector diagrams of voltages considered in the phase discriminator.
Figure 5:
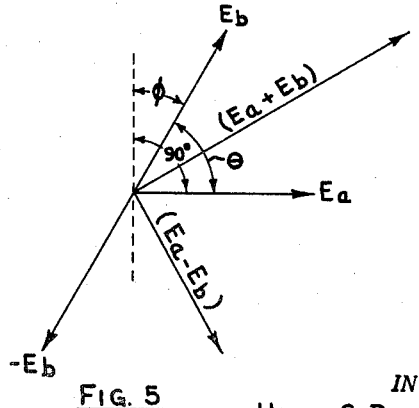

Referring also now to Figures 4 and 5 and considering the quantity $n$ equal to 1, the vector relations of the two voltages to be considered for phase relation are represented. In Figure 4 the phase angle $\theta$ of the two voltages $E_a$ and $E_b$ is 90 degrees wherein the absolute magnitude of the vectors $\bar{E}_a+\bar{E}_b$ and $\bar{E}_a-\bar{E}_b$ are equal. Under these conditions the meter 45 (Figure 3) will read zero. As represented in Figure 5, $E_b$ leads $E_a$ by less than 90 degrees wherein the absolute quantity $|\bar{E}_a+\bar{E}_b|$ is greater than the absolute quantity $|\bar{E}_a-\bar{E}_b|$ and the positive D. C. potential of the terminal point $f$ with respect to $z$ is greater than the positive D. C. potential of terminal point $h$ wherein the indicator 45 will show a positive potential representative of the lead angle $\phi$. It may be noted that interchanging $E_a$ and $E_b$ will not reverse the polarity of the output but if either $E_a$ or $E_b$ is reversed in polarity, the output potential will be reversed.

Figure 6:
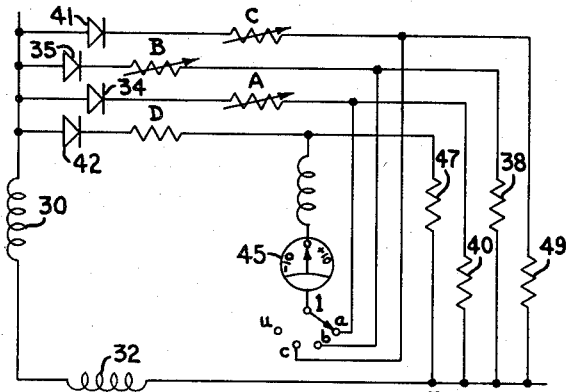
Figure 6 is a simplified circuit diagram of the diode compensating circuit of Figure 1.

Figure 6 is a simplification of the diode and potentiometer check circuits shown in Figure 1 with like reference characters representing like parts. These check circuits are an important feature of this invention to substantially match the diode circuits. It is necessary to accuracy in the phase discriminator network to have the forward resistance of all diodes alike. If the upper half circuit diodes were alike but unlike the lower half circuit diodes, an output voltage to the indicator 45 would occur when a 90 degree relationship exists between the voltages $E_a$ and $E_b$. In the present invention a simple method of matching diodes is accomplished by placing the four diodes across terminal points $x$—$z$ (Figure 3) and adjusting the related variable resistances A, B, and C with respect to the fixed resistance D in series with diode 42. As taken from Figure 1, each diode is connected across terminal points $x$ and $z$, one fixed diode circuit constituting diode 42 and the fixed resistances D and 47. The other diode circuits are in parallel to the fixed diode circuit in the respective series relations of diode 34, variable resistance A and fixed resistance 40; diode 35, variable resistance B, and fixed resistance 38; and diode 41, variable resistance C, and fixed resistance 49. The phase meter indicator 45 is arranged to be switched across any diode circuit with variable resistance A, B, or C therein and the fixed diode circuit with the fixed resistor D therein. The indicator 45 is switched by gang 1 of the gang switch 3S.

Using Figure 6 as a guide it is believed that the means shown in Figure 1 for checking and matching the diodes will now be apparent. The gang switch 3S is switched to the contact $u$ in all six gangs when the phase discriminator is in condition to get a phase angle reading on the indicator 45. To check and match the diodes 34, 35, and 41 with that of diode 42 the gang switch is turned to the $c$ contact position and the diode 41 matched with that of 42 by adjustment of the variable resistance C to null the meter 45. The diodes 35 and 34 can be matched with the diode 42 by the same procedure of switching the gang switch 3S to the $a$ and $b$ positions and adjusting the variable resistances A and B, respectively. The procedure is carried out with the two voltages under consideration applied to the phase meter. This matching of the diode circuits also compensates for variations in resistance of the windings. This check is made simple by the present invention and should be made occasionally with use and whenever the voltage levels are changed. In the above manner the diode circuits can be matched to produce accurate phase angle readings from the indicator 45.

In combination with the diode checking means it is also of importance in this invention to compensate for phase shift between the primary and secondary windings of the transformers. That is, the phase relation of the input voltages may be 90 degrees but this phase relation may change by being transformed in transformers T1 and T2. This compensation is accomplished through the use of switches 1S and 2S and of adjusting the capacitance 25 or 25'. The effect of unlike phase shift in two transformers is to give inconsistent results on the indicator 45 when the inputs are interchanged by the switch 1S. Switch 1S switches channel 1 to the primary 22 of transformer T1 and channel 2 to the primary 23 of transformer T2, and vice versa. The switch 2S will reverse the leads to the primary 23 of transformer T2. By switching the switches 1S and 2S to each of its two positions and adjusting the phase compensating circuit 25 (or 25'), the phase shift difference between the two transformers and their secondaries can be made alike, reference being made to the indicator 45 in making the adjustment.

The discriminator circuit is shown and described as a full wave rectifier although the invention is equally applicable to a half-wave rectifier. By using a full-wave rectifier circuit, however, the effects of harmonics are minimized.

In the practical use and operation of the present phase meter the components 12, 13, 18, and 20 are all assembled in a single unit or cabinet and the various switches, variable controls, and indicators are assembled on the face thereof as is well understood. When the phase relation of two voltages is desired it is only necessary to couple them to the channel terminals 10 and 11. All checking of the phase meter, and particularly of the phase discriminator, to compensate for transformer phase differences and for diode differences is done with the input voltages applied and without the aid of independent external standards. The means disclosed by this invention provides a very accurate and reliable phase meter very useful in determining the phase relation of two voltages in order that they may be corrected or changed as desired.

While many modifications and changes may be made in the constructional details and arrangement of parts in the present device without departing from the spirit and scope of the invention, it is to be understood that I desire to be limited only by the scope of the appended claims.

I claim:

1. In a phase meter, a phase discriminator comprising; a pair of transformers each adapted to have a primary winding coupled to an alternating current source the phase relation of which is to be determined, one of which transformers has one center-tapped secondary and the other of which has two center-tapped secondaries, the end leads of said secondary of said one transformer each being connected respectively to the center taps of said other transformer secondaries and the end leads of the secondaries of said other transformer each being connected across a load to the center tap of said one transformer secondary, the connection of said end leads of said other transformer having a rectifier means and a rectifier matching means therein; means for switching the input current sources to the primaries of said transformers; means for reversing the polarity of the input current to the primary of either of said transformers; and means coupled to the primary of either of said transformers for matching the phase relation of the primary and secondary of said transformers.

2. A phase discriminator as set forth in claim 1 wherein said rectifier matching means comprises a variable resistance in series with each rectifier means whereby said rectifier means can be matched by relative adjustments of said variable resistances.

3. A phase discriminator as set forth in claim 1 wherein said means coupled to the primary of either of said transformers includes an adjustable phase shifting means for shifting the phase angle of the primary to the secondary of said transformer primaries to match the phase shift between the primary and secondary of the other of either of the transformers.

4. A phase discriminator as set forth in claim 1 wherein said rectifier means are diodes and said rectifier matching means are variable resistances whereby said diodes can be matched by relative adjustment of said variable resistances, and said means coupled to the primary of either of one of said transformers is an adjustable capacitive network whereby phase matching of said transformers is accomplished by adjusting said capacitive network to a null position for all positions of said input switching and said polarity switching means.

5. In a phase meter a phase discriminator comprising, a pair of transformers with the secondary of one transformer connected across the mid-points of the secondaries of the other transformer, separate alternating current voltages adapted to be coupled to each of the primaries of said transformers, switch means in the primary circuits for switching the voltage inputs to said primaries, means coupled to the primary of said one transformer for compensating the phase relation of primary and secondary of said one transformer to match the phase relation of the primary and secondary in said other transformer through the manipulation of said switch means, a rectifier means and a rectifier matching means in series in each lead of said other transformer across a load to the mid-point of the secondary of said one transformer, and means to meter the voltage in each series whereby the rectifier means can be matched in function by said rectifier matching means and said transformer phase relations can be compensated by said compensating means co-ordinated with said switch means with reference to said metering means to condition the phase meter for indicating true phase relations between two voltage inputs.

6. A phase discriminator as set forth in claim 5 wherein said means coupled to the primary of said one transformer for compensating the phase relation in said transformers is a variable capacitance.

7. In a ninety degree phase meter for indicating the phase relation of two voltage inputs known to have a close ninety degree phase relation, a phase discriminator comprising; two transformers one of which has four quad-filar secondaries and the other of which has two bi-filar secondaries, the quad-filar secondaries being paired in two series and the bi-filar secondaries being coupled across the mid-point of each quad-filar pair; a rectifier in each of two leads of each pair of quad-filar secondaries, the leads of opposite pairs being united and connected through a load to the mid-point of said bi-filar secondary, said rectifiers of opposite pairs of said quad-filar secondaries being directed to rectify the full wave of a voltage through the respective load; variable resistance means in three of the four leads and a fixed resistance in the last of the four leads of said quad-filar secondaries between said respective rectifier and load for matching the rectifier functions in each said lead; switch means in the primary circuits of both transformers, polarity reversing switch means in the primary of said transformer having said bi-filar secondary, and an adjustable capacity network in parallel to the primary of either transformer for compensating the phase difference of the primary and secondaries between both said transformers; and meter indicating means switchable to be connected across the load for indicating the phase relation of two voltage inputs and to be connected across each series of a rectifier, a variable resistance, a load, and the series of a rectifier, the fixed resistance, and load.

References Cited in the file of this patent

UNITED STATES PATENTS

| | | |
|---|---|---|
| 1,684,403 | Mason | Sept. 18, 1928 |
| 2,529,723 | Chevallier | Nov. 14, 1950 |
| 2,542,627 | Chevallier | Feb. 20, 1951 |
| 2,703,380 | Fraser | Mar. 1, 1955 |
| 2,759,109 | Swift | Aug. 14, 1956 |

OTHER REFERENCES

AIEE Miscellaneous Paper, No. 51–270, May 1951, report on "Direct Reading Phasemeter," by Amorosi et al.